United States Patent
Sentoff

(10) Patent No.: US 7,512,967 B2
(45) Date of Patent: Mar. 31, 2009

(54) USER AUTHENTICATION IN A CONVERSION SYSTEM

(75) Inventor: Stephen Hedley Sentoff, West Chicago, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 764 days.

(21) Appl. No.: 11/025,564

(22) Filed: Dec. 29, 2004

(65) Prior Publication Data

US 2006/0143705 A1    Jun. 29, 2006

(51) Int. Cl.
*H04L 9/32* (2006.01)
*G06F 17/13* (2006.01)

(52) U.S. Cl. .............................. 726/3; 726/14
(58) Field of Classification Search .................. 726/3, 726/14

See application file for complete search history.

(56) References Cited

U.S. PATENT DOCUMENTS

| | | | |
|---|---|---|---|
| 6,571,095 B1* | 5/2003 | Koodli ...................... | 455/435 |
| 6,687,243 B1* | 2/2004 | Sayers et al. ................ | 370/356 |
| 6,707,813 B1* | 3/2004 | Hasan et al. ................ | 370/356 |
| 6,857,072 B1* | 2/2005 | Schuster et al. ............. | 713/160 |
| 6,898,577 B1* | 5/2005 | Johnson ...................... | 705/51 |
| 6,937,597 B1* | 8/2005 | Rosenberg et al. .......... | 370/356 |
| 6,993,658 B1* | 1/2006 | Engberg et al. ............. | 713/185 |
| 7,024,690 B1* | 4/2006 | Young et al. ................ | 726/5 |
| 7,177,658 B2* | 2/2007 | Willenegger et al. ........ | 455/522 |
| 7,295,511 B2* | 11/2007 | Sharma et al. .............. | 370/217 |
| 7,421,735 B2* | 9/2008 | Kerstens et al. ............. | 726/12 |
| 2005/0036482 A1* | 2/2005 | Goroshevsky et al. ....... | 370/352 |

OTHER PUBLICATIONS

Handley et al., RFC 2543, "SIP: Session Initiation Protocol," 1999.*
Franks et al., RFC 2617, "HTTP Authentication: Basic and Digest Access Authentication," 1999.*
International Telecommuncation Untion, "H.235," May 2003.*
Ho et al., A Conference Gateway Supporting Interoperability Between SIP and H.323, 2001, ACM, pp. 421-430.*
Stephens et al., SIP and H.323—Interworking VoIP Networks, Apr. 2001, BT Technol J vol. 19, No. 2, pp. 119-127.*
Weiss, Security Concerns with VoIP, Aug. 2001, Sans Institute, pp. 1-7.*

* cited by examiner

*Primary Examiner*—Kambiz Zand
*Assistant Examiner*—William S Powers

(57) ABSTRACT

Systems and methods are described for authenticating users. One embodiment comprises a conversion system that includes a first interface, a processing system, and a second interface. The processing system receives a user ID and user credentials in a first protocol from a first communication device through the first interface. The processing system processes the user ID and a key to generate a computed password, and then derives credentials from the computed password. The processing system compares the user credentials to the derived credentials. If the user credentials and the derived credentials correspond, then the processing system authenticates the user. The processing system then generates new user credentials from the computed password according to a second protocol used by a second communication device, and transmits the user ID and the new user credentials to the second communication device through the second interface.

20 Claims, 5 Drawing Sheets

USER AUTHENTICATION IN A CONVERSION SYSTEM

BACKGROUND OF THE INVENTION

1. Field of the Invention

The invention is related to the field of communications, and in particular, to providing authentication of users in a conversion system by using a key to compute passwords to authenticate the users.

2. Statement of the Problem

Voice over Internet Protocol (VoIP) communications is gaining popularity in businesses and private residences. To get VoIP service, a user contacts a VoIP service provider and the VoIP service provider provides the user with an account, a telephone number, etc. The user obtains a user name and a password in order to log in to the account to receive the VoIP service. Upon power up of the user's VoIP phone, the VoIP phone registers with a telephony server of the service provider. As part of the registration process, the telephony server attempts to authenticate the user by requesting a user ID and proof that the user has the password, in the form of a set of credentials. The user may enter the user ID and the password through a dialog window of a user interface on the VoIP phone, or the VoIP phone may be programmed with the user ID and the password. In either case, the VoIP phone derives credentials based on the password, and transmits the user ID and the credentials to the telephony server. The credentials can only be derived if the password is known. In this way, the user can prove he or she has the password, without exposing the password to unauthorized persons. The telephony server uses the same method to derive credentials from the user's password known to the telephony server, and then compares the user ID and the credentials received from the user to a known user ID and the derived credentials to authenticate the user.

Some times the protocol used by the VoIP phone is different than the protocol used by the telephony server of the service provider. In this instance, a protocol converter (or signaling converter) is used as a gateway between the VoIP phone and the telephony server. If the different protocols are compatible for authentication purposes, then the protocol converter forwards the user ID and credentials from the VoIP phone to the telephony server and the telephony server performs the user authentication.

If the different protocols are not compatible for authentication purposes, a problem exists that the protocol converter cannot just forward the user ID and the credentials to the telephony server. For instance, one protocol used in older generations of VoIP service is H.323 protocol. One protocol used in newer generations is Session Initiation Protocol (SIP). H.323 and SIP are not compatible for authentication purposes as different cryptographic techniques are used to generate the credentials for a user and there is no clean conversion between the protocols. If an H.323 VoIP phone initiates a call to a SIP telephony server, then a protocol converter needs to authenticate the user in H.323 protocol.

To authenticate the user, the protocol converter receives a user ID and the credentials of the user in the H.323 protocol. The protocol converter compares the received user ID and credentials with a stored user ID and the credentials derived from a password stored for the user in order to authenticate the user. The protocol converter either stores user IDs and passwords for multiple users of the service provider, or queries a master database that stores user IDs and passwords for multiple users. If the received user ID and credentials match the stored user ID and the credentials derived from the stored password, then the protocol converter is able to verify the identity of the user. The protocol converter then generates new credentials for the user according to the SIP protocol used by the telephony server, and transmits the user ID and the new credentials to the telephony server. The telephony server then authenticates the user in a similar manner in SIP.

One problem with operating a protocol converter in the manner described above is that an undue burden is put on the protocol converter to authenticate users. If the protocol converter stores user IDs and passwords for multiple users internally, then the protocol converter unfortunately needs to include and maintain a large database in order to store the user IDs and passwords for authentication purposes. If the protocol converter queries a master database for user IDs and passwords, then the protocol converter unfortunately needs to have a signaling link and associated circuitry capable of communicating with the master database according to a protocol used by the master database.

SUMMARY OF THE SOLUTION

The invention solves the above and other related problems by using a key to compute passwords to authenticate a user in a conversion system. When a user ID and user credentials are received from a user for authentication purposes, the conversion system generates a computed password based on the user ID and a key. The conversion system then compares the user credentials received from the user with credentials derived from the computed password to authenticate the user. For each user ID received, the conversion system can generate a computed password individually using the key. The conversion system need only store the key in order to provide authentication functions for multiple users. The passwords also cannot be forged by those not having the key, which adds security.

By using the key to generate computed passwords, the conversion system advantageously avoids having to maintain a database of user IDs and user passwords for multiple users. The conversion system also advantageously avoids having to access a master database of user IDs and user passwords for multiple users.

One embodiment of the invention comprises a conversion system that includes a first interface, a processing system, and a second interface. The first interface communicates with a first communication device (e.g., a Voice over Internet Protocol (VoIP) phone) of a user according to a first protocol. The second interface communicates with a second communication device (e.g., a telephony server of a VoIP service provider) according to a second protocol. The first protocol and the second protocol are not compatible for the purpose of authenticating the user of the first communication device.

Assume that the second communication device needs to authenticate the user of the first communication device to provide a service to the user, such as VoIP service. Because the communication devices use different protocols, the conversion system assists in authenticating the user. The first interface of the conversion system receives a user ID and user credentials of the user from the first communication device. The first interface transmits the user ID and the user credentials to the processing system. The processing system processes the user ID and a key to generate a computed password. The processing system then derives credentials from the computed password. Next, the processing system compares the user credentials received from the user to the derived credentials. If the user credentials and the derived credentials correspond with one another (e.g., the credentials match), then the processing system authenticates the user. The processing system generates new user credentials according to the second protocol used by the second communication device, and transmits the user ID and the new user credentials to the second interface. The second interface transmits the user ID and the new user credentials to the second communication device. If the user credentials and the derived credentials do not correspond with one another (e.g., the credentials do not match), then the processing system denies authentication of the user.

The invention may include other exemplary embodiments described below.

DESCRIPTION OF THE DRAWINGS

The same reference number represents the same element on all drawings.

DETAILED DESCRIPTION OF THE INVENTION

FIGS. 1-5 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
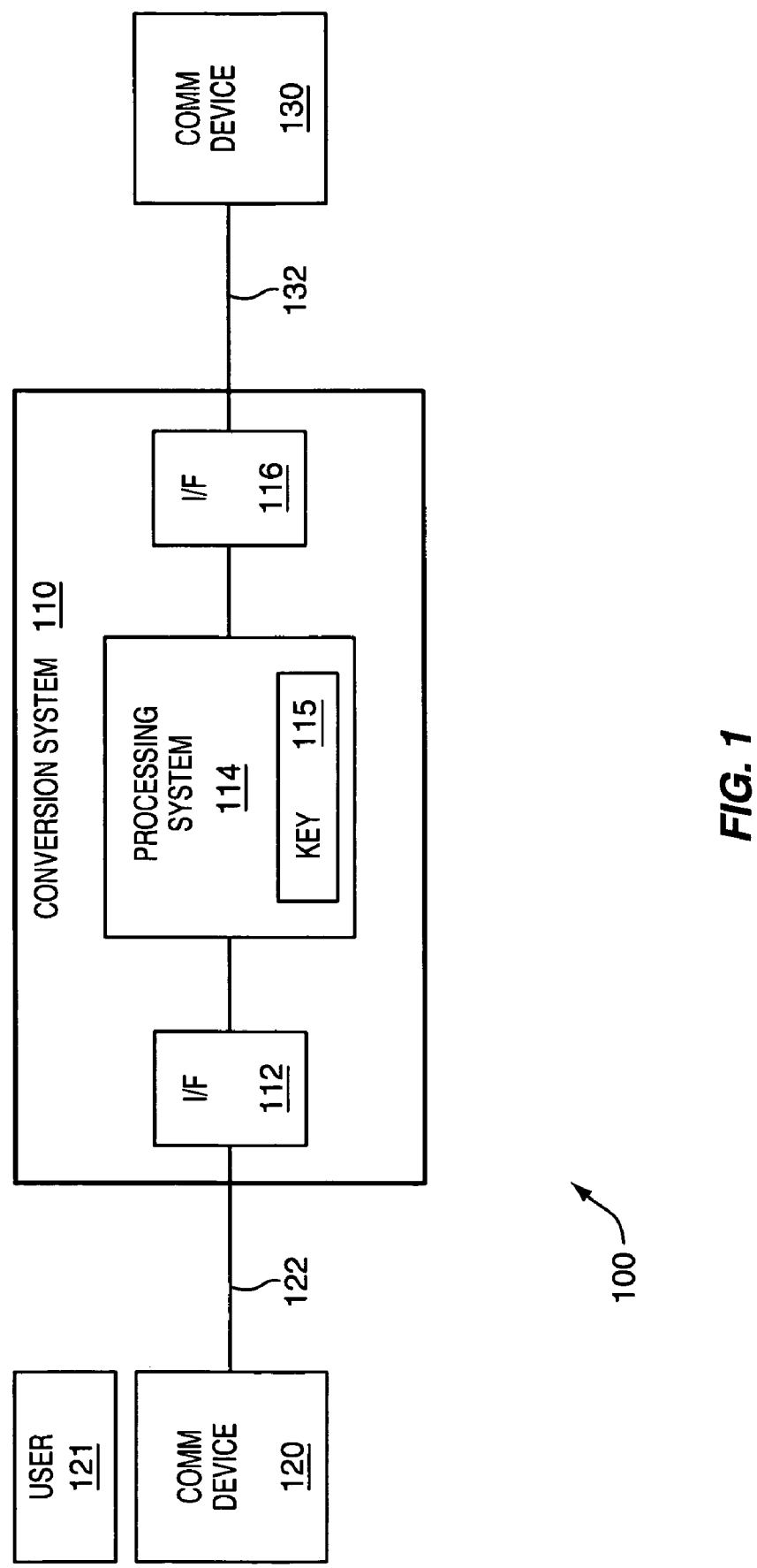
FIG. 1 illustrates a communication network in an exemplary embodiment of the invention.

FIG. 1 illustrates a communication network 100 in an exemplary embodiment of the invention. Communication network 100 includes a communication device 120, a conversion system 110, and a communication device 130. Conversion system 110 includes an interface 112, a processing system 114, and an interface 116. Conversion system 110 may be termed a signaling converter or a protocol converter, but is not limited to the conventional operation of a signaling converter or a protocol converter. Interface 112 is connected to communication device 120 over a link 122 and communicates according to a first protocol. Interface 116 is connected to communication device 130 over a link 132 and communicates according to a second protocol. Links 122, 132 may be wireless links, electrical links, optical links, or any other communication links or communication paths. Communication network 100 and conversion system 110 may include other components, devices, or systems not shown in FIG. 1.

The first protocol and the second protocol used in communication network 100 are not compatible for the purpose of authenticating user 121 of communication device 120. When the protocols are not compatible, there is no direct correlation between a user ID and user credentials in the first protocol and a user ID and user credentials in the second protocol. For instance, the first protocol may comprise H.323 and the second protocol may comprise Session Initiation Protocol (SIP), which are incompatible for authentication purposes as they use different cryptographic techniques for user IDs and user credentials.

Assume that communication device 130 needs to authenticate user 121 of communication device 120 to provide a service to user 121, such as Voice over Internet Protocol (VoIP) service. To authenticate user 121, user 121 enters a user ID and a user password through a dialog window of a user interface on communication device 120. In other embodiments, communication device 120 may be programmed with the user ID and the user password. The user's password was previously generated based on key 115 and the user ID, and provided to user 121. Communication device 120 derives user credentials from the user password entered by user 121 and transmits the user credentials to conversion system 110. Credentials comprise information or data that is derived from a password to prove the identity of a user. The credentials are derived to verify whether a user provides a proper password, but avoid having to transmit the actual password where there would be a risk of intercepting of the password. The user ID and the user credentials are in a first protocol used by communication device 120. Because communication devices 120 and 130 use different protocols, conversion system 110 assists in authenticating user 121.

Figure 2:
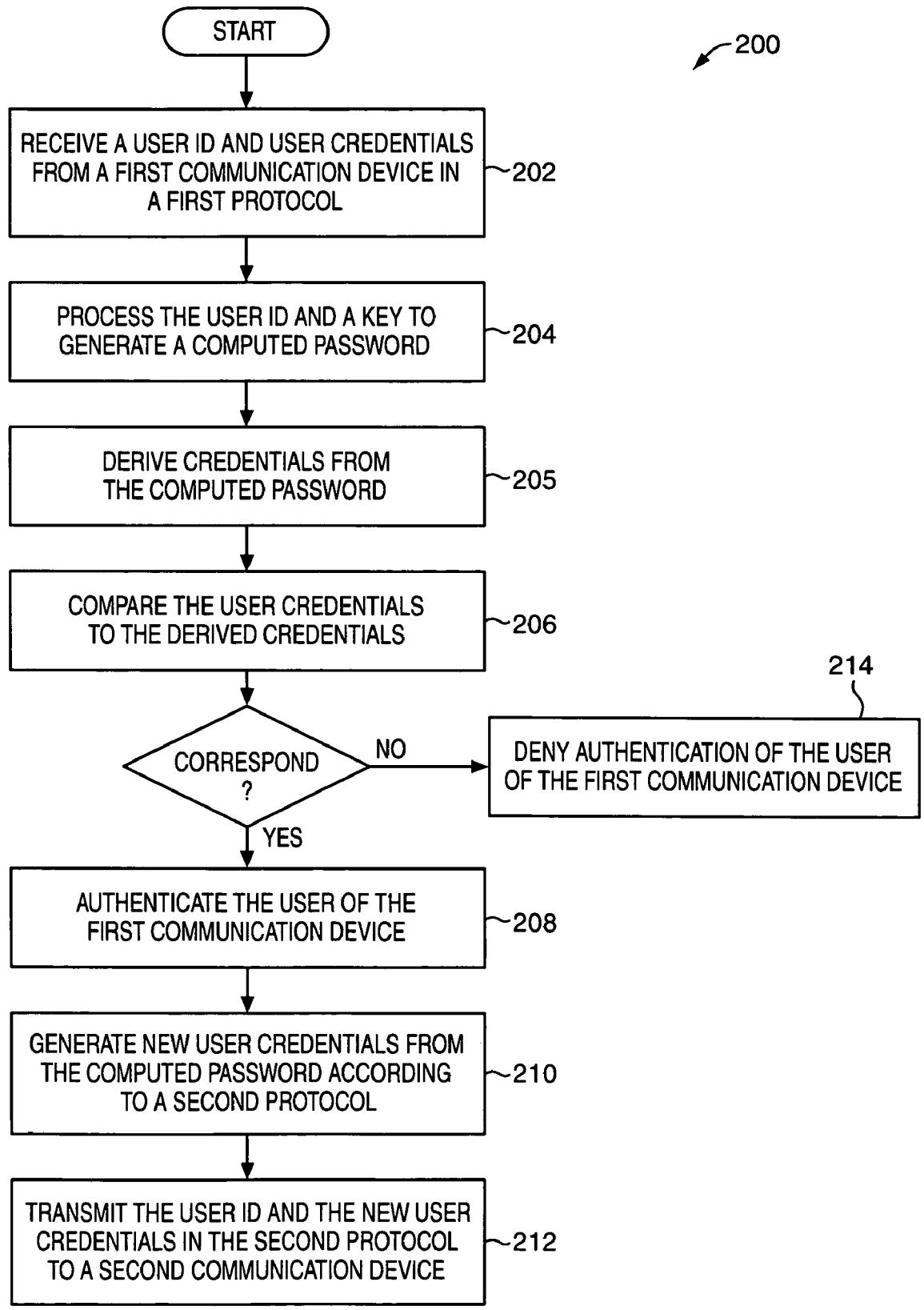
FIG. 2 is a flow chart illustrating a method of operating a conversion system for authenticating a user in an exemplary embodiment of the invention.

FIG. 2 is a flow chart illustrating a method 200 of operating conversion system 110 for authenticating user 121 in an exemplary embodiment of the invention. In step 202, conversion system 110 receives the user ID and the user credentials of user 121 from communication device 120 through interface 112. Interface 112 transmits the user ID and the user credentials received from user 121 to processing system 114. In step 204, processing system 114 processes the user ID and a key 115 to generate a computed password. Key 115 comprises any variable value that is applied using an algorithm to a user ID to generate a password. The computed password may be considered an encrypted version of the user ID or a digital signature of the user ID, where the encryption depends on the key. In step 205, processing system 114 derives credentials from the computed password. In step 206, processing system 114 compares the user credentials received from user 121 to the derived credentials.

If the user credentials and the derived credentials correspond with one another (e.g., the credentials match), then processing system 114 authenticates user 121 in step 208. Authenticating the user in this embodiment means that the identity of user 121 is verified as the user authorized for a particular service or a particular account. Processing system 114 make take any further steps to indicate that user 121 was authenticated. In step 210, processing system 114 generates new user credentials from the computed password according to the second protocol used by communication device 130. Processing system 114 then transmits the user ID and the new user credentials in the second protocol to interface 116. In step 212, interface 116 transmits the user ID and the new user credentials to communication device 130. Communication device 130 may perform further authentication of user 121.

If the user credentials and the derived credentials do not correspond with one another (e.g., the credentials do not match), then processing system 114 denies authentication of user 121 in step 214. Processing system 114 may indicate to communication device 120 and/or communication device 130 that authentication was denied.

Figure 3:
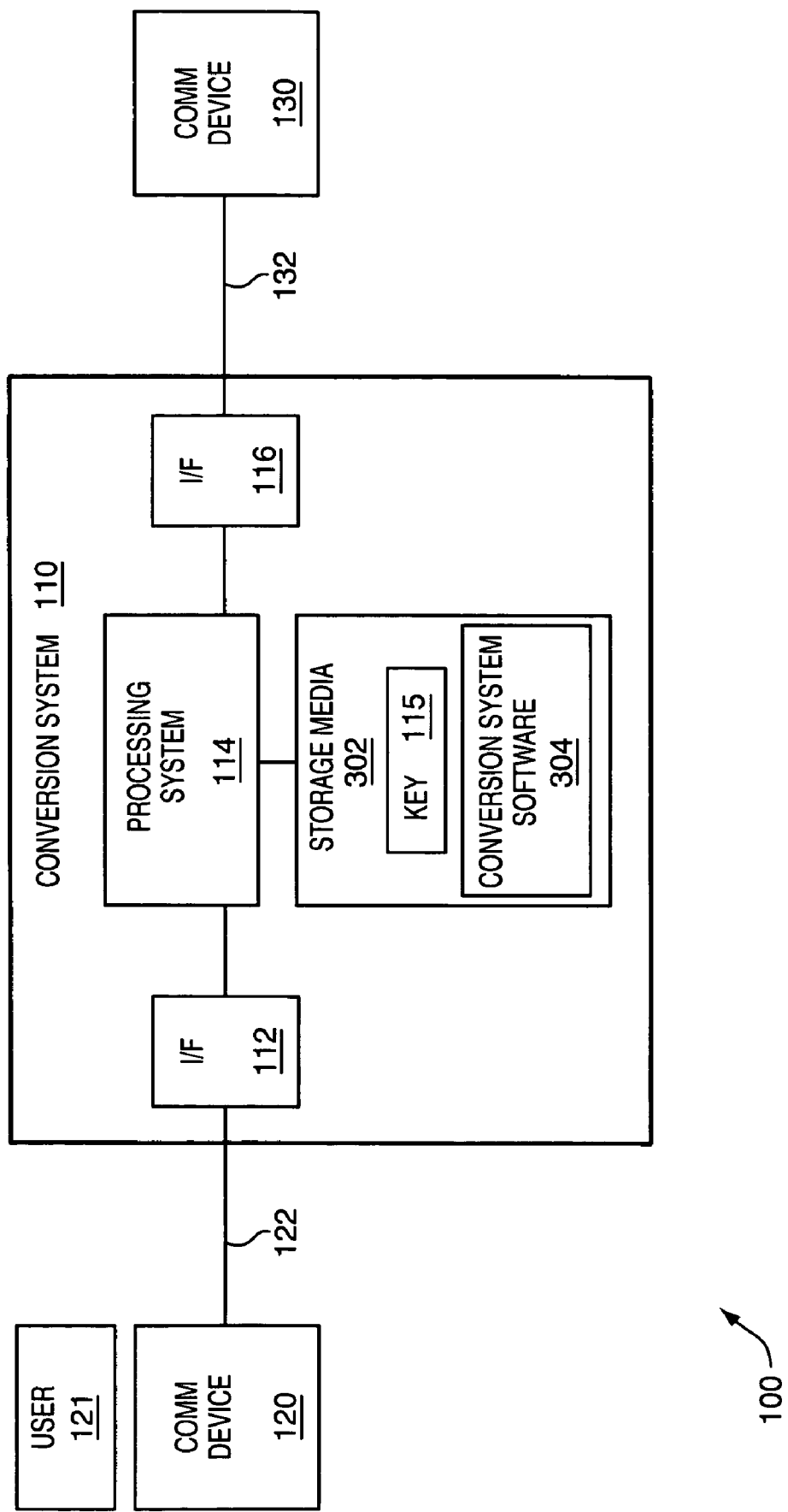
FIG. 3 illustrates the communication network with the conversion system further including conversion system software in an exemplary embodiment of the invention.

FIG. 3 illustrates communication network 100 with conversion system 110 further including conversion system software 304 in an exemplary embodiment of the invention. Conversion system 110 stores conversion system software 304 in storage media 302. Conversion system software 304 may be retrieved and executed by processing system 114. Some examples of software are instructions, program code, and firmware. Some examples of storage media 302 are memory devices, tape, disks, integrated circuits, and servers. Conversion system software 304 is operational when executed by processing system 114 to direct the processing system 114 to operate conversion system 110 as described in relation to FIG. 2. The term "processing system" refers to a single processing device or a group of inter-operational processing devices. Some examples of processing systems are computers, integrated circuits, and logic circuitry.

Figure 4:
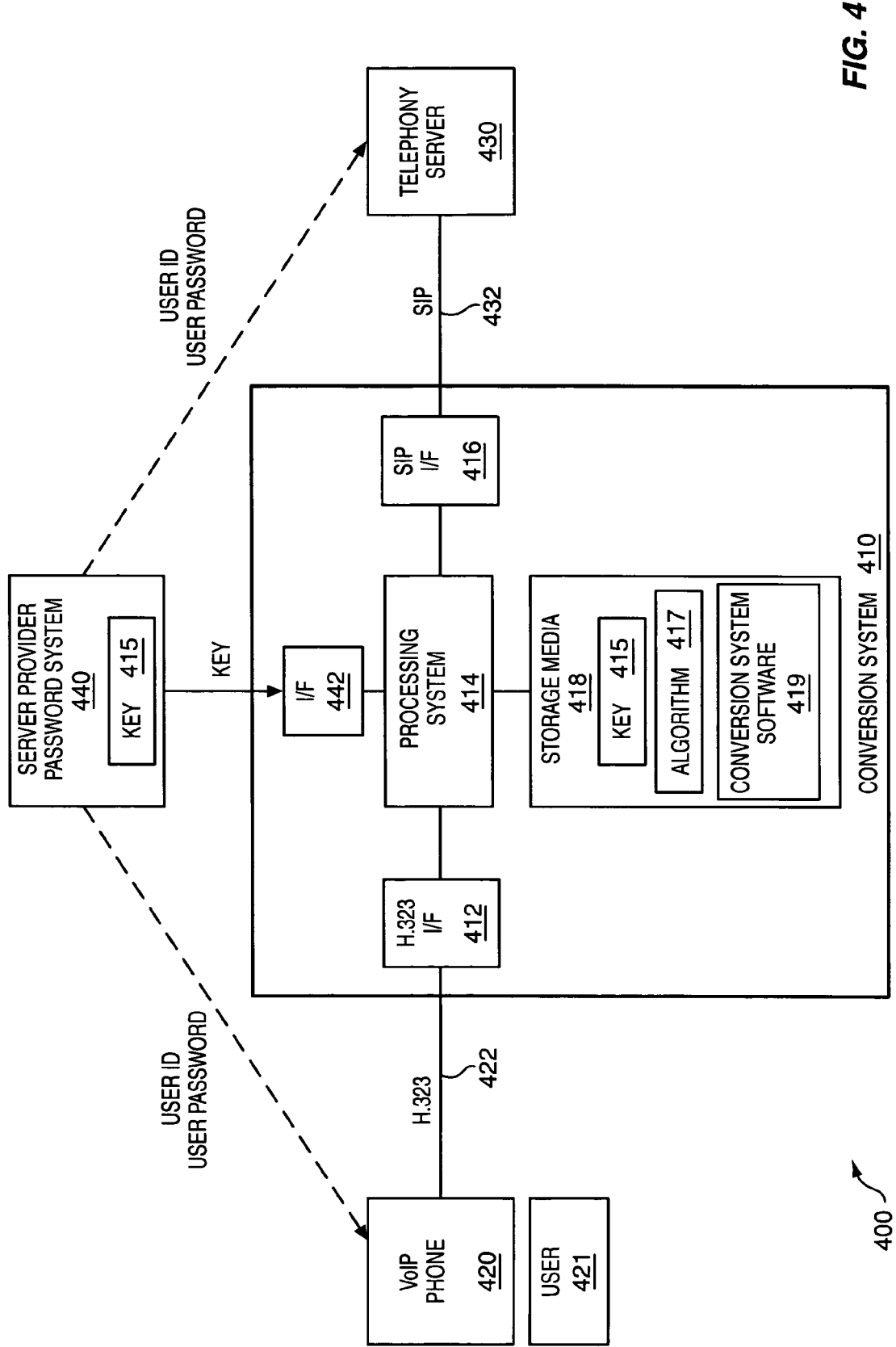
FIG. 4 illustrates another communication network in an exemplary embodiment of the invention.

FIG. 4 illustrates another communication network 400 in an exemplary embodiment of the invention. Communication network 400 represents a VoIP communication network in which a service provider provides VoIP service. Communication network 400 includes a VoIP phone 420, a conversion system 410, a service provider telephony server 430, and a service provider password system 440. In other embodiments, VoIP phone 420 may comprise a VoIP enterprise PBX or any other VoIP communication device. Conversion system 410 includes an H.323 interface 412, a processing system 414, a SIP interface 416, an interface 442 for communicating with password system 440, and storage media 418. Storage media 418 is accessible by processing system 414 and stores key 415, algorithm 417, and conversion system software 419. Password system 440 also includes key 415. Communication network 400 and conversion system 410 may include other components, devices, or systems not shown in FIG. 4.

Interface 412 is connected to VoIP phone 420 over a link 422 and communicates according to H.323 protocol. Interface 416 is connected to telephony server 430 over a link 432 and communicates according to SIP. Links 422, 432 may be wireless links, electrical links, optical links, or any other communication links or communication paths.

Figure 5:
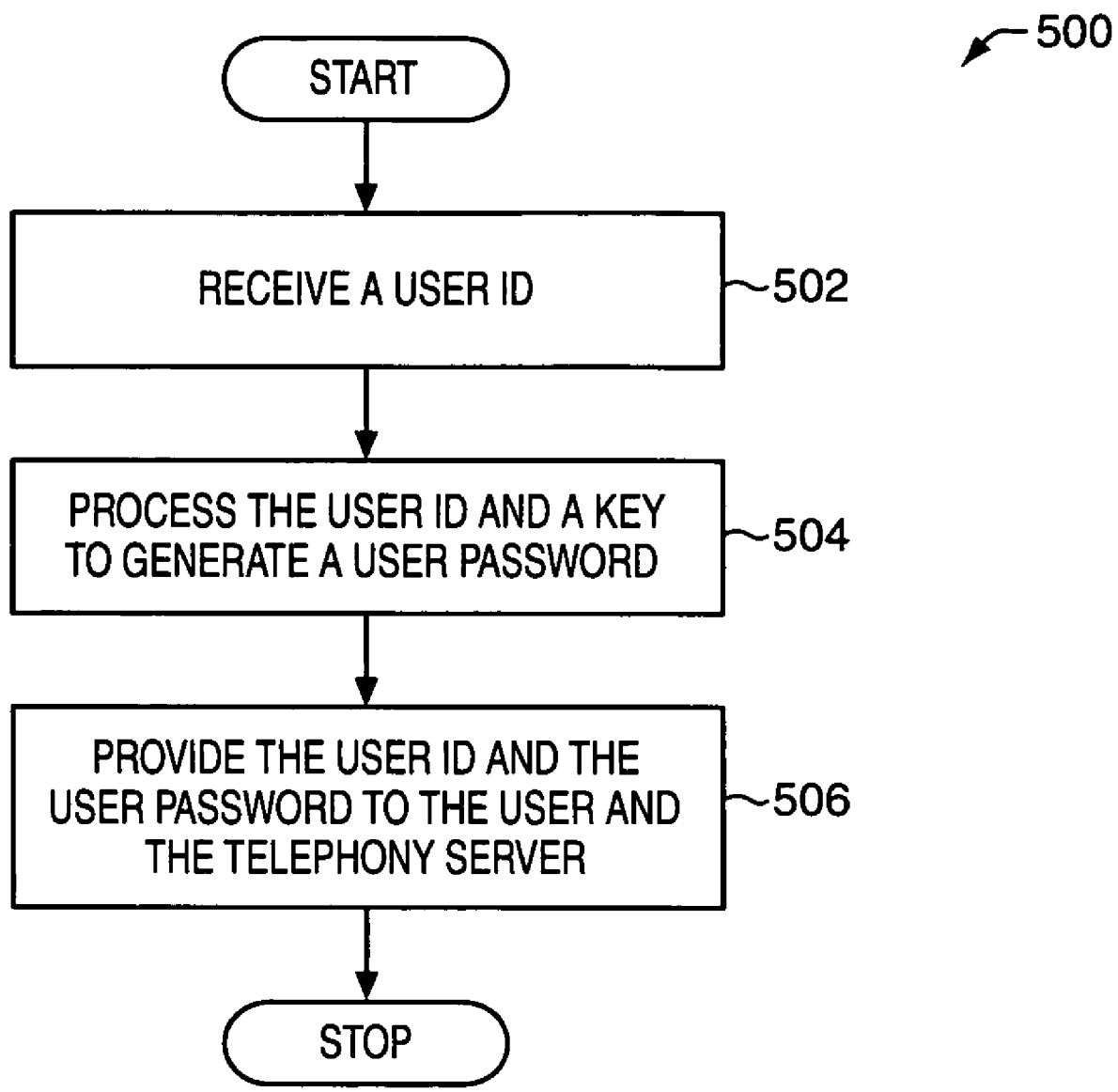
FIG. 5 is a flow chart illustrating a method of operating a password system in an exemplary embodiment of the invention.

When user 421 signs up for VoIP service with the service provider, password system 440 assigns user 421 a user password. Password system 440 assigns the user password based on a user ID of user 421. FIG. 5 is a flow chart illustrating a method 500 of operating password system 440 in an exemplary embodiment of the invention. In step 502, password system 440 receives a user ID for user 421. The user ID may be selected by user 421 or by the service provider. In step 504, password system 440 processes the user ID and key 415 to generate a user password for user 421. The user password is essentially a digital signature of the user ID. In step 506, password system 440 provides the user ID and user password to user 421 (or VoIP phone 420) and to telephony server 430. In the case of user 421, the service provider may provide the user ID and user password to user 421 through the mail, through email, or some other means. In the case of telephony server 430, password system 440 may transmit the user ID and the user password to telephony server 430 over a network for storage at telephony server 430, or may provide a network address where telephony server 430 can access the user ID and the user password. Password system 440 performs method 500 for multiple users.

At some time, password system 440 also transmits key 415 to conversion system 410 (see FIG. 4). Password system 440 does not have to transmit the user password to conversion system 410 as conversion system 410 only needs key 415. Conversion system 410 receives key 415 through interface 442, and interface 442 forwards key 415 to processing system 414. Processing system 414 stores key 415 in storage media 418. In this embodiment, key 415 is unique to conversion system 410 and is used by conversion system 410 for all users that attempt to access telephony server 430 through conversion system 410. In other embodiments, key 415 may be used for multiple conversions systems (not shown) in network 400.

To use the VoIP service, user 421 needs to log in to telephony server 430. To log in, user 421 enters his/her user ID and user password into a dialog window on a user interface on VoIP phone 420. VoIP phone 420 then derives user credentials from the entered user password, and transmits the user ID and the user credentials to conversion system 410 in H.323 protocol. In some instances, VoIP phone 420 may be programmed with the user ID and user password and automatically transmits the user ID and the user credentials to conversion system 410, such as on command, on power up, etc.

Interface 412 receives the user ID and the user credentials from VoIP phone 420. Interface 412 transmits the user ID and the user credentials to processing system 414. Processing system 414 executes conversion system software 419 to do the following. Processing system 414 retrieves algorithm 417 and key 415 from storage media 418. Algorithm 417 comprises any function that generates a computed password based on a user ID and a key. Algorithm 417 may comprise a one-way hashing function, such as the Message Digest 5 hashing function. Processing system 414 enters the user ID received from VoIP phone 420 and key 415 into algorithm 417 to yield a computed password. Processing system 414 then derives credentials from the computed password.

Because key 415 was used to generate the user password provided to user 421 and key 415 was used to generate the computed password, the credentials derived from these two passwords should match if user 421 entered the correct password. Therefore, processing system 414 compares the user credentials received from VoIP phone 420 to the derived credentials.

If the user credentials and the derived credentials do not match, then processing system 414 denies authentication of user 421. Processing system 414 may indicate to VoIP phone 420 and/or the service provider that authentication was denied.

If the user credentials and the derived credentials match, then processing system 414 authenticates user 421. Processing system 414 may take any further steps to indicate that user 421 was authenticated. Processing system 414 then generates new user credentials according to SIP and transmits the user ID and the new user credentials in SIP to interface 416. Interface 416 transmits the user ID and the new user credentials to telephony server 430.

Telephony server 430 receives the user ID and new user credentials in SIP. Telephony server 430 may then perform its own authentication. If telephony server 430 stores user IDs and user passwords for each of its users, then telephony server 430 accesses a database (not shown) resident on telephony server 430 to retrieve a user password assigned to user 421. If the telephony server 430 stores the user IDs and user passwords remotely, then telephony server 430 accesses a remote database (not shown) to retrieve a user password assigned to user 421. Telephony server 430 derives credentials from the user password, and compares the new user credentials received from conversion system 410 to the derived credentials to authenticate the user.

The conversion systems described herein provide many advantages. For each user ID, the conversion systems can generate a computed password individually using a key. The conversion systems need only store the key in order to provide authentication functions for multiple users. By using the key, the conversion system advantageously avoids having to maintain a database of user IDs and user passwords for multiple users. The conversion system also advantageously avoids having to access a master database of user IDs and user passwords for multiple users.

I claim:

1. A conversion system, comprising:
a first interface that receives a user ID and user credentials of a user in a first protocol from a first communication device;
a processing system that receives the user ID and the user credentials from the first interface, processes the user ID and a key to generate a computed password, derives credentials from the computed password, compares the user credentials and the derived credentials, authenticates the user of the first communication device if the user credentials correspond with the derived credentials, and generates new user credentials from the computed password according to a second protocol responsive to authenticating the user; and
a second interface that receives the user ID and the new user credentials in the second protocol from the processing system and transmits the user ID and the new user credentials in the second protocol to a second communication device.

2. The conversion system of claim 1 wherein the processing system denies authentication of the user of the first communication device if the user credentials do not correspond with the derived credentials.

3. The conversion system of claim 1 further comprising:
a third interface that receives the key from a service provider password system; and
transmits the key to the processing system.

4. The conversion system of claim 1 wherein the processing system processes the user ID and the key according to a one-way hashing function.

5. The conversion system of claim 1 wherein the first protocol comprises H.323 protocol and the second protocol comprises Session Initiation Protocol (SIP).

6. The conversion system of claim 1 wherein the first communication device comprises a Voice over Internet Protocol (VoIP) phone and the second communication device comprises a telephony server of a service provider of VoIP service.

7. A method of authenticating users, the method comprising:
receiving a user ID and user credentials of a user in a first protocol in a conversion system from a first communication device;
processing the user ID and a key in the conversion system to generate a computed password;
deriving credentials based on the computed password;
comparing the user credentials and the derived credentials;
if the user credentials correspond with the derived credentials, then:
authenticating the user of the first communication device;
generating new user credentials from the computed password according to a second protocol; and
transmitting the user ID and the new user credentials in the second protocol to a second communication device.

8. The method of claim 7 further comprising:
denying authentication of the user of the first communication device if the user credentials do not correspond with the derived credentials.

9. The method of claim 7 further comprising:
receiving the user ID in a service provider password system;
processing the user ID and the key to generate the user password; and
transmitting the user ID and the user password to the first communication device and the second communication device.

10. The method of claim 9 further comprising:
transmitting the key from the service provider password system to the conversion system.

11. The method of claim 7 wherein the step of processing the user ID and a key to generate a computed password comprises:
processing the user ID and the key according to a one-way hashing function.

12. The method of claim 7 wherein the first protocol comprises H.323 protocol and the second protocol comprises Session Initiation Protocol (SIP).

13. The method of claim 7 wherein the first communication device comprises a Voice over Internet Protocol (VoIP) phone and the second communication device comprises a telephony server of a service provider of VoIP service.

14. The method of claim 7 further comprising:
receiving the user ID and the user credentials in the second protocol in the second communication device, and
processing the user ID and the user credentials to authenticate the user in the second communication device.

15. A software product, comprising:
conversion system software executable by a processing system to receive a user ID and user credentials of a user in a first protocol from a first communication device, process the user ID and a key to generate a computed password, derive credentials from the computed password, compare the user credentials and the derived credentials, authenticate the user of the first communication device if the user credentials correspond with the derived credentials, and generate new user credentials from the computed password according to a second protocol and transmit the user ID and the new user credentials in the second protocol to a second communication device responsive to authenticating the user; and
storage media that stores the conversion system software.

16. The software product of claim 15 wherein the conversion system software is executable by the processing system to deny authentication of the user of the first communication device if the user credentials do not correspond with the derived credentials.

17. The software product of claim 15 wherein the conversion system software is executable by the processing system to receive the key from a service provider password system.

18. The software product of claim 15 wherein the conversion system software is executable by the processing system to process the user ID and the key according to a one-way hashing function.

19. The software product of claim 15 wherein the first protocol comprises H.323 protocol and the second protocol comprises Session Initiation Protocol (SIP).

20. The software product of claim 15 wherein the first communication device comprises a Voice over Internet Protocol (VoIP) phone and the second communication device comprises a telephony server of a service provider of VoIP service.

* * * * *